United States Patent

Christoph et al.

[15] 3,646,814
[45] Mar. 7, 1972

[54] PRESSURE DETECTOR

[72] Inventors: Walter R. Christoph, Riverdale; Jim B. McQuitty, Adelphi; Lewis A. Vendetti, Rockville, all of Md.

[73] Assignee: The United States of America as represented by the Secretary of the Navy

[22] Filed: Sept. 16, 1970

[21] Appl. No.: 72,682

[52] U.S. Cl. ............................................73/398 R, 73/141 R
[51] Int. Cl. .............................................................G01l 9/18
[58] Field of Search ......................73/398 R, 141 R; 317/230

[56] References Cited

UNITED STATES PATENTS 3,307,084   2/1967   Zeitz et al. ..............................317/230

Primary Examiner—Donald O. Woodiel
Attorney—R. S. Sciascia and J. A. Cooke

[57] ABSTRACT

An electrochemical pressure transducer having a pressure-responsive, compliant diaphragm on either face of a cylindrical body. Pressure on either diaphragm produces movement of electrolyte fluid within the body past a series of electrodes which are connected to external electrical circuitry. As the electrolyte flows past these electrodes $I_3^-$ ions are converted into $I_1^-$ ions, thereby causing a current flow in the external circuitry indicative of the direction and amount of pressure. Two electrodes are provided which substantially eliminate bias currents produced by freezing of the electrolyte solution at low temperatures, and a third electrode is provided that enhances the linearity of the transducer and ensures proper indication of the direction of pressure at high flow rates.

6 Claims, 4 Drawing Figures

INVENTORS
W. P. Christoph
J. B. McQuitty
L. A. Vendetti

PRESSURE DETECTOR

BACKGROUND OF THE INVENTION

This invention relates generally to electrochemical pressure detectors, and more particularly to an electrochemical pressure detector for measuring both the direction and the magnitude of pressure applied thereto.

Pressure detectors are used in a wide range of applications, including oceanographic studies. For example, they may be used for measurement of pressure variations in the sea caused by variable water pressure. In many applications, it is desirable to have a self-contained unit which, in combination with signal processing equipment can analyze the data from many such detectors. An example of such a pressure detector is disclosed in U.S. Pat. No. 3,116,635. Often, it is necessary to transport such detectors to many parts of the world for oceanographic studies and to subject them to many correspondingly different climatological conditions. Thus, it is desirable to have a pressure detector capable of operating properly over a wide range of temperatures.

If presently used electrochemical pressure detectors employing liquid electrolytes are subjected to temperature below 10° F., the electrolyte solution may crystallize, resulting in a bias current that adversely affects operation. Thus, for example a bias current of one polarity may be the equivalent of a negative pressure signal and the sensitivity of the detector may be incorrectly increased, while a bias current of the opposite polarity might falsely indicate a positive pressure and concurrently produce decreased sensitivity. When the detector is brought to ocean or room temperatures the crystals will eventually dissolve and the bias current will disappear. The time required, however, for the bias current to cease is usually four to ten days, and may be as long as 30 days. Thus, it is difficult to obtain reliable results during the thawing period in prior art devices.

SUMMARY OF THE INVENTION

Accordingly, one object of the instant invention is to provide a new and improved pressure detector.

Another object of the instant invention is the provision of an improved electrochemical pressure detector.

Still another object of the present invention is the provision of an electrochemical pressure detector capable of operating accurately at low temperatures.

A further object of the instant invention is the elimination of freezing - bias currents in electrochemical pressure detectors.

Briefly, in accordance with one embodiment of this invention, these and other objects are obtained by providing in a pressure detector having an anode and a pair of polarity cathodes, an additional pair of ring cathodes which convert $I_3^-$ ions made available by ambient (nonsignal) ion migration to $I_1^-$ ions before they reach the polarity cathodes, and a neutral cathode which converts $I_3^-$ ions in a manner which enhances the operation of the polarity cathodes.

DESCRIPTION OF THE PREFERRED EMBODIMENT

Figure 1:
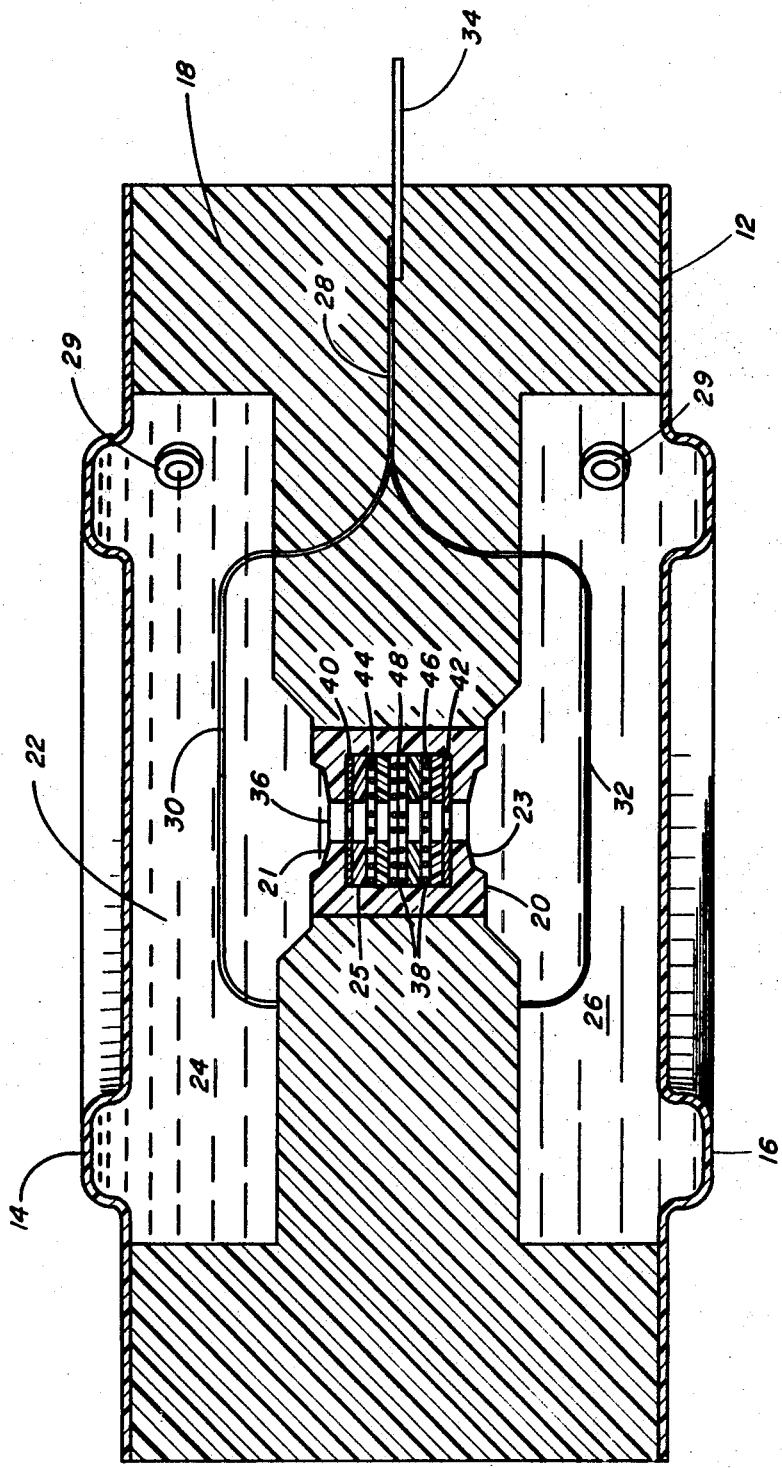
FIG. 1 is a cross-sectional view along line 1413 1 of FIG. 2 of the pressure detector of the instant invention.
Figure 2:
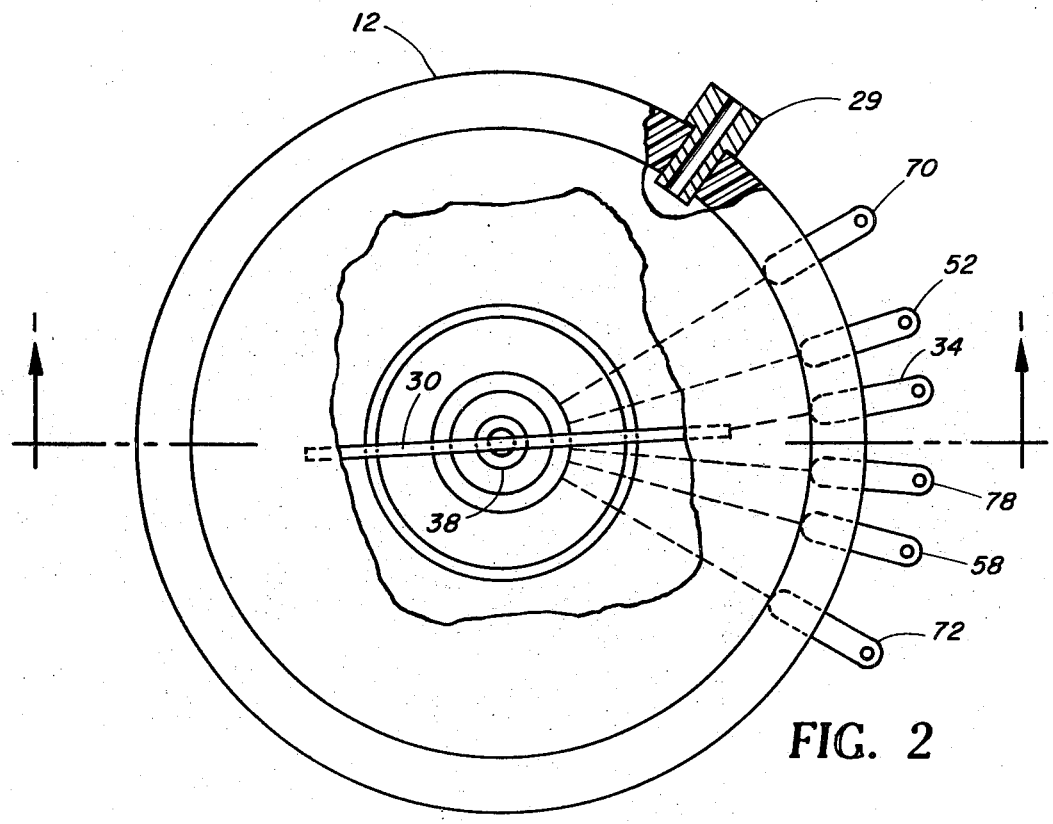
FIG. 2 is a top view of the pressure detector shown coupled to the external electrical circuitry according to the present invention.

Referring now to the drawings wherein like reference characters designate identical or corresponding parts throughout the several views, and more particularly to FIGS. 1 and 2 which illustrate a preferred embodiment of the invention as including a cylindrical-shaped container 12 having a pair of force or pressure responsive compliant, plastic diaphragms 14 and 16 secured to opposite faces of an annular shaped member 18 made of suitable electric insulator, such as plastic. An electrically insulating ring 20 having a small axial aperture 36 therein compared to the outer diameter of member 18 is cemented to the inner circumference of member 18. Ring 20 has opposing faces 21 and 23 which have tapered portions to permit a liquid electrolyte to flow easily therethrough. In addition, ring 20 has a radial cavity 25 for inserting electrodes, more fully described hereinbelow.

A first chamber 24 for containing a liquid electrolyte 22 is defined by annular member 18, ring 21, the diaphragm 14, while a second chamber for containing a liquid electrolyte 22 is defined by annular member 18, ring 21, and diaphragm 16. Electrolyte 22, which substantially fills both chambers, may be an acqueous solution containing a large amount of potassium iodide and a small concentration of iodine. It is poured into container 12 through a fill port 29, which is simply an annular opening formed through member 18 into chambers 24 and 26, that is sealed after the chambers have been substantially filled.

An anode 28, having a pair of arms 30 and 32 which are inserted in chambers 24 and 26, respectively, is imbedded in annular member 18. Anode 28 is electrically connected to an external terminal 34, shown more clearly in FIG. 2.

Pressure applied to one of the diaphragms, such as diaphragm 14 causes the liquid electrolyte 22 to flow from chamber 24 through axial aperture 36 in ring 20 and into the other chamber 26. As the electrolyte flows through aperture 36 it passes through a series of electrodes 38 whose operations will be more fully described with reference to FIGS. 3 and 4.

Figure 3:
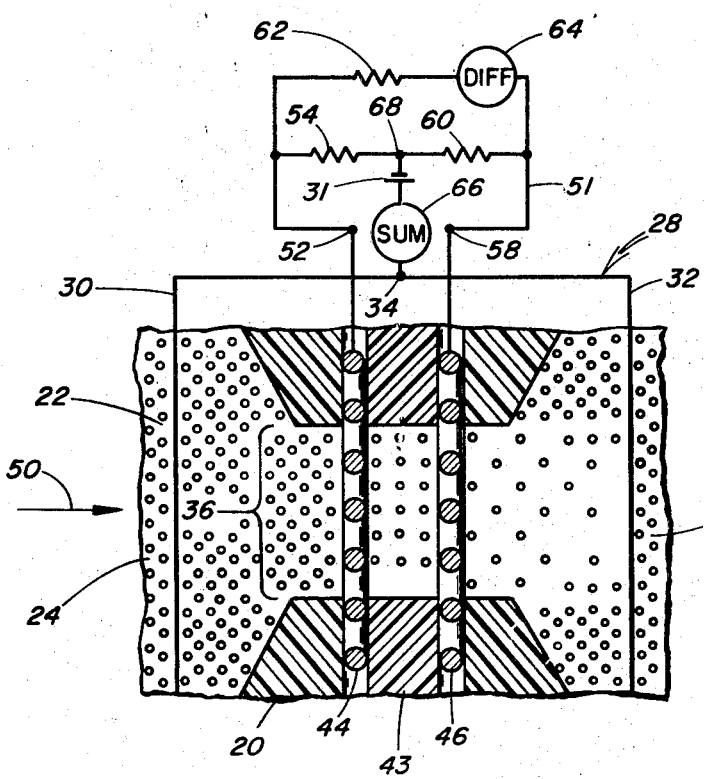
FIG. 3 is an enlarged view of the central portion of the prior art pressure detector, corresponding to the central portion of FIG. 1, shown coupled to the external circuitry of the prior art detector which is represented schematically.

FIG. 3 illustrates an enlarged cross-sectional view of ring 20 and aperture 36 of a prior art pressure sensor, such as disclosed in U.S. Pat. No. 3,116,635, of which this invention is an improvement. In the embodiment of FIG. 3, two electrodes are positioned in radial cavity 25 of ring 20, a pair of parallel polarity cathodes 44 and 46, which are separated and electrically insulated from each other by a washer 43. The polarity cathodes are preferably made of platinum gauze through which electrolyte solution 22 passes. Cathode 44 is connected electrically to an external terminal 52, and cathode 46 is connected electrically to an external terminal 58, shown more clearly in FIG. 2, which, while illustrating a view of the instant invention, also indicates the terminal connections for the polarity cathodes and anode of the prior art device of FIG. 3.

Terminals 34, 52 and 58 of the prior art pressure detector are connected to an external electrical circuit 51 which measures both the amount and direction of pressure on the sensor in a manner more fully described hereinbelow.

If the prior art pressure sensor of FIG. 3 is placed in an environment wherein diaphragm 14 is deformed inwardly by force or pressure applied thereto, the electrolyte liquid 22 will flow from chamber 24 through aperture 36 into chamber 26, passing through cathodes 44 and 46. The direction of electrolyte flow in FIG. 3 is indicated by arrow 50. The concentration of reactable ions, i.e., the triodide or $I_3^-$ ions which pass through cathode 44 is proportional to the external flow or pressure applied to the cell. The number of dots on the diagram represents the reactable $I_3^-$ ion concentrations at particular locations in the cell.

Cathodes 44 and 46 are supplied with a negative voltage with respect to anode 28 by a unidirectional electrical energy source, such as a battery 31, in external circuit 51. The voltage amplitude is chosen so that the electrolyte solution will not decompose. For an acqueous solution containing iodine and potassium iodide the voltage between cathodes 44 and 46 and anode 28 does not exceed 0.9 volt. As a result of this external potential, a reduction occurs at cathode 44, wherein an $I_3^-$ ion combines with two electrons to form three $I_1^-$ ions. Simultaneously at anode 28, three iodide ions give up two electrons to the anode and form the $I_3^-$ ion in solution as a result of a current flow through external circuit 51, described more fully hereinafter. When the solution passes through cathode 44 the number of reactable $I_3^-$ ions is decreased by a certain proportion. As the solution flows through cathode 46 a further reduction occurs, causing a second current flow into external circuit 51 as more fully described hereinafter.

In external circuit 51, current from cathode 44 flows to anode 28 through a resistor 54 connected to a juncture 68, through battery 31 and a DC ammeter 66, labeled SUM in FIG. 3. In turn, current from cathode 46 flows to anode 28 through a resistor 60, juncture 68, battery 31 and ammeter 66. Since both currents flow in the same direction through sum ammeter 66, the total current flow through both cathodes is indicated thereon, and it may be calibrated in terms of flow or pressure applied to the container.

Since the number of $I_3^-$ ions reacting with cathode 44 is greater than that reacting with cathode 46, there will be a greater current flow through resistor 54 than through resistor 60. The difference in current flow is determined by a resistor 62 in series with a DC ammeter 64, both of which are in parallel with resistors 54 and 60. Resistor 62 is of a much greater magnitude than resistance of either resistors 54 and 60 to minimize alteration of the voltage across these resistors. The direction of current flow through resistor 62 and ammeter 64 depends upon the relative amplitudes of currents in cathodes 44 and 46, which in turn depend upon the direction of external pressure applied to the pressure detector. Thus, ammeter 64 indicates the direction of external flow.

The $I_3^-$ ions that are not reduced by either cathode pass into chambers 26. The fluid passing into chamber 26 mixes with the liquid therein and quickly returns to its initial concentration of iodide and triiodide ions by the action of the anode arm 32. As the cathode 46 is giving up electrons to form three $I_1^-$ ions from an $I_3^-$ ion, three $I_1^-$ ions give up two electrons to the anode arm 32 and form an $I_3^-$ ion in the solution at that point. Having both arms 30 and 32 of the anode connected to each other prevents a steady state condition at normal operating temperatures in which the ion concentration in the two chambers will differ from one another. The necessary electron charges to return both chambers to balanced concentration will flow through the short circuit between the arms as a natural consequence of any imbalance. Thus, at normal operating temperatures the only response of the device will be that produced due to Brownian motion, since otherwise no current flows between anode and cathode elements unless the liquid is moving through the pair of cathodes.

Figure 4:
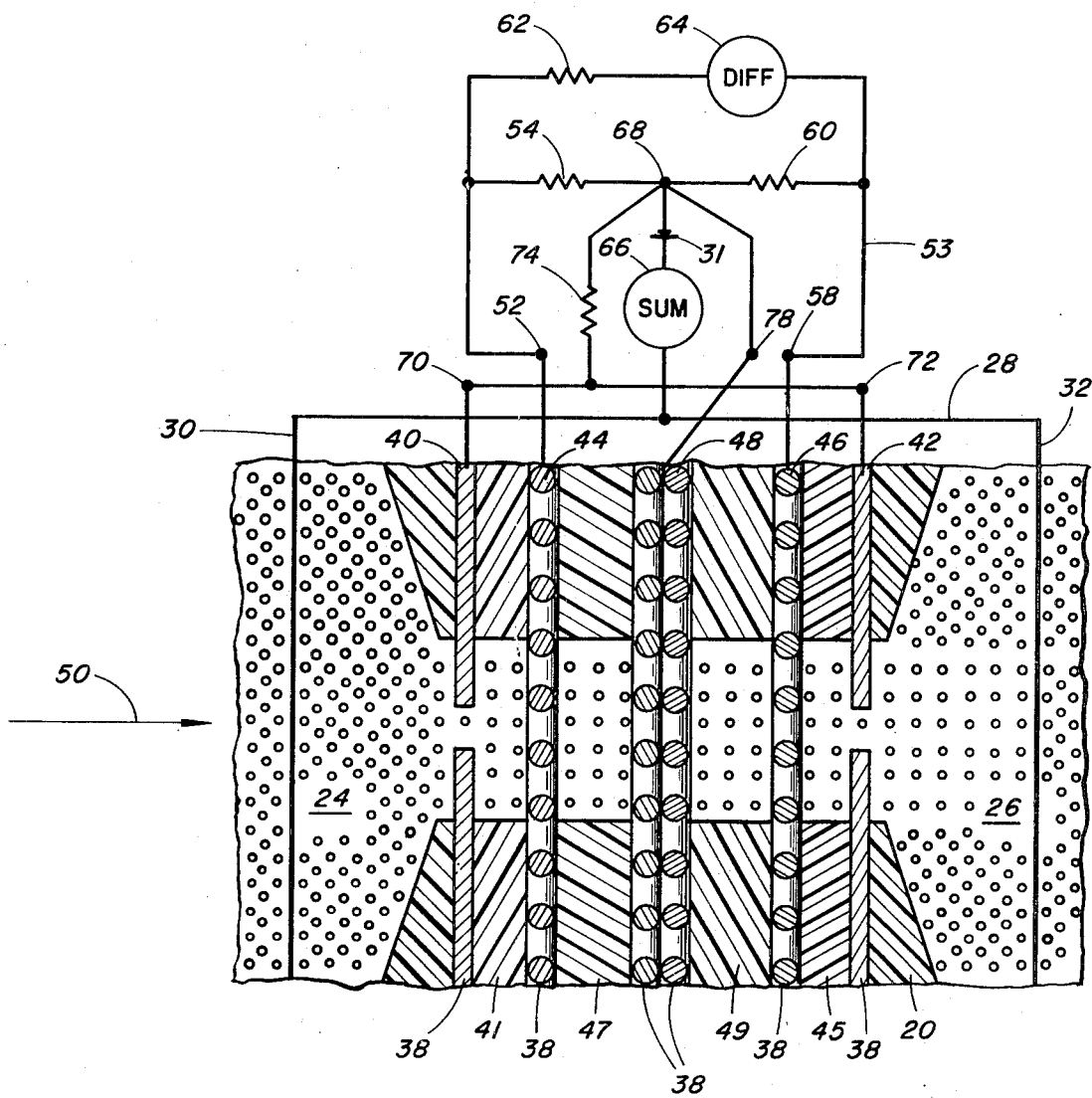
FIG. 4 is an enlarged view of the central portion of FIG. 1 as well as a schematic diagram of the external circuitry connected thereto.

FIG. 4 illustrates the improved pressure detector of the instant invention wherein the freezing bias current which develops due to freezing a temperatures below 10° F. is eliminated. A ring electrode 40 is positioned between chamber 24 and cathode 44 in cavity 25 of ring 20 and separated from cathode 44 by an insulating washer 41, and a ring electrode 42 is positioned between chamber 26 and cathode 46 in cavity 25 of ring 20 and separated from cathode 46 by an insulating washer 45. Each ring electrode is preferably constructed of a sheet of platinum having a central aperture through which electrolyte solution passes and both are oriented parallel to polarity cathode 44 and 46. Ring electrodes 40 and 42 are electrically connected together externally between terminals 70 and 72. However, it should be noted that these two electrodes may be connected internally and a lead brought out to a single terminal.

As the temperature of the pressure detector drops below 10° F., the electrolyte 22 crystallizes, resulting in a substantial bias current after thawing. The ring electrodes 40 and 42 sharply curb these bias currents by converting the $I_3^-$ ions made available by ambient ion migration into $I_1^-$ ions before they reach the polarity cathodes 44 and 46. Each $I_3^-$ ion contacting ring electrode 40 or 42 combines with two electrons to form three $I_1^-$ ions, as previously described with reference to the polarity cathodes of the prior art embodiment of FIG. 3.

An external electrical circuit 53 is connected to the output terminals of the pressure transducer, which has the same sum and difference circuitry as the external circuit 51 of FIG. 3. In addition, a resistor 74 is connected between terminals 70 and 72 and common point 68. The current from ring electrodes 40 and 42 flows through resistor 74 to common point 68, and then through battery 31, ammeter 66 and anode 28. Thus the bias currents completely avoid the difference circuitry of resistor 62 and ammeter 64, and therefore do not affect its operation. The increased current flow through sum ammeter 66 is minimized by choosing a large value for resistor 74. This resistance also acts to reduce any loss of sensitivity resulting from unwanted capture of $I_3^-$ ions by the ring electrodes when an external flow is present. The reduced sensitivity in the instant invention is also minimized by suitably increasing the concentration of iodine in the electrolyte.

Between cathode 44 and 46 a cathode 48 is positioned. It is separated from cathodes 44 and 46 by insulating washers 47 and 49 respectively. Cathode 48 is preferably made of a double layer of platinum gauze that allows passage of electrolyte solution therethrough. It is connected through a terminal 78 to a juncture 68. Any flow of $I_3^-$ ions between cathodes 44 and 46 will contact neutral cathode 48. A current will flow to point 68, battery 31, sum ammeter 66 and finally through anode 28 into the solution. Thus, bias currents in this circuit will also bypass the difference ammeter 64.

Although the current through sum ammeter 66 is increased by the contributions from ring cathodes 40 and 42 and neutral cathode 48, the amount of contribution from these sources is known and can be compensated for in the sum ammeter by appropriate biasing. These current flows, as an added benefit, substantially increase the linearity of the sum circuit. As described previously, the function of the sum circuit is to measure the amplitude of the flow. In the prior art device of U.S. Pat. No. 3,116,635, this measurement was linear over a decade of amplitudes. By adding the electrodes of the present invention, this linearity is increased to two decades.

It should be understood that in the present invention, alternate cathode design is possible, including single fine-wire cathode and coarse-mesh cathode for each of the cathodes.

It should be apparent that any suitable loads, such as magnetic amplifiers may be substituted for the ammeters so that the detector current can actuate any appropriate apparatus. Also, the sensitivity of the cell can be varied by increasing or decreasing the reactable ion concentration of the electrolyte solution.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. In a pressure detector comprising a container having compliant force responsive elements, a liquid electrolytic medium disposed in said container, an anode immersed in said medium, a first pair of separate, spaced, cathodes immersed in said medium, and first electric circuit means connected to said anode and said cathodes for indicating the direction and amount of said medium passing through said cathodes in response to the application of pressure on said compliant force-responsive elements, the improvement comprising:

a second pair of cathodes, each being positioned between one of said compliant force responsive elements and one of said first pair of cathodes;

a neutral cathode positioned between said first pair of cathodes; and second electric circuit means coupled to said first electric circuit means to said second pair of cathodes and to said neutral cathode for channeling freezing-bias current from said second pair of cathodes to said anode.

2. The detector of claim 1 wherein said second pair of cathodes are formed of sheet platinum and have a central aperture to allow passage therethrough of said electrolytic medium.

3. The detector of claim 1 wherein said first pair of cathodes, said second pair of cathodes, and said neutral cathode are oriented in parallel relationship.

4. The detector of claim 1 wherein said neutral cathode is formed of platinum gauze mesh.

5. The detector of claim 1 wherein said first electric circuit means comprises:

means coupled to said first pair of cathodes and to said anode for providing potentials therebetween; and means coupled to said first pair of cathodes for measuring the difference between currents therein.

6. The detector of claim 5 wherein said second electric circuit means comprises:

resistance means coupled between said second pair of cathodes and said means for providing potentials; and means coupling said neutral cathode to said means for providing potentials.

* * * * *

UNITED STATES PATENT OFFICE
CERTIFICATE OF CORRECTION

Patent No. 3,646,814        Dated March 7, 1972

Inventor(s) Walter P. Christoph, Jim B. McQuitty, Lewis A. Vendetti

It is certified that error appears in the above-identified patent and that said Letters Patent are hereby corrected as shown below:

Correct "Walter R. Christoph" to --Walter P. Christoph--.

Signed and sealed this 27th day of June 1972.

(SEAL)
Attest:

EDWARD M. FLETCHER, JR.        ROBERT GOTTSCHALK
Attesting Officer              Commissioner of Patents